(12) United States Patent
Rizzo

(10) Patent No.: US 10,688,604 B2
(45) Date of Patent: Jun. 23, 2020

(54) PLATFORM BASE AND STAND ADJUSTING DEVICE USED IN COMBINATION WITH A WELDERS SHIELD ENCLOSURE AND WELDER'S GUN AND/OR TORCH

(71) Applicant: Martin H. Rizzo, Oceanside, NY (US)

(72) Inventor: Martin H. Rizzo, Oceanside, NY (US)

( * ) Notice: Subject to any disclaimer, the term of this patent is extended or adjusted under 35 U.S.C. 154(b) by 477 days.

(21) Appl. No.: 15/477,278

(22) Filed: Apr. 3, 2017

(65) Prior Publication Data

US 2017/0282307 A1  Oct. 5, 2017

Related U.S. Application Data

(60) Provisional application No. 62/318,503, filed on Apr. 5, 2016.

(51) Int. Cl.
*B23K 37/00* (2006.01)
*B23K 9/32* (2006.01)

(52) U.S. Cl.
CPC .............. *B23K 37/00* (2013.01); *B23K 9/321* (2013.01)

(58) Field of Classification Search
CPC ...... B23K 37/00; B23K 9/321; B23K 37/006; B23K 37/04
USPC ........ 219/72, 75, 105, 121, 136, 137.2, 138, 219/147
See application file for complete search history.

(56) References Cited

U.S. PATENT DOCUMENTS

| 1,337,662 | A | | 4/1920 | La Porte |
| 1,716,096 | A | | 6/1929 | Weeks |
| 1,826,186 | A | | 10/1931 | Morton |
| 1,944,125 | A | | 1/1934 | Halbing |
| RE20,790 | E | * | 7/1938 | Bowers ..................... A61F 9/06 2/8.1 |
| 2,210,370 | A | | 8/1940 | Herradora |
| 2,235,594 | A | | 3/1941 | Smith |
| 2,336,283 | A | | 12/1943 | Neill |
| 2,390,149 | A | | 12/1945 | Hopper |
| 2,683,877 | A | | 7/1954 | Boltich |
| 2,856,510 | A | | 10/1958 | Jones et al. |
| 3,573,425 | A | | 4/1971 | Damon |
| 3,581,049 | A | | 5/1971 | Creith |
| 3,671,707 | A | * | 6/1972 | Cunningham ....... B23K 9/0061 219/74 |
| 3,914,796 | A | * | 10/1975 | Barta ....................... A61F 9/06 2/8.6 |

(Continued)

FOREIGN PATENT DOCUMENTS

WO  WO2009037280  3/2009

*Primary Examiner* — Jimmy Chou
(74) *Attorney, Agent, or Firm* — Berenato & White, LLC

(57) ABSTRACT

A welding shield with a welding tool in combination with an adjusting device for adjusting position of a welding tool tip. The welding shield comprises a welding shield body having an outer wall, a weld viewer, and a fastening device for securing the welding tool. The adjusting device includes a platform base comprising a floor member, a wall member surrounding the floor member and a sub-floor slot formed in the floor member. The sub-floor slot has a sub-floor surface spaced inwardly from a floor surface of the floor member. The outer wall of the protective welding shield is configured to be mounted to the floor member of the platform base so that a bottom edge of the welding shield body is disposed within the wall member of the platform base and the welding tip of the welding tool faces the sub-floor slot.

24 Claims, 15 Drawing Sheets

(56) References Cited

U.S. PATENT DOCUMENTS

| | | | | |
|---|---|---|---|---|
| 4,005,305 A * | 1/1977 | Nelson | B23K 9/0286 | 219/72 |
| 4,034,633 A * | 7/1977 | Petersen | B23Q 11/0891 | 82/152 |
| 4,035,602 A * | 7/1977 | Berghof | B23K 9/0061 | 219/72 |
| 4,039,798 A * | 8/1977 | Lythall | B23K 9/0061 | 219/72 |
| 4,095,080 A * | 6/1978 | Ueyama | B23K 9/164 | 219/137.41 |
| 4,172,974 A * | 10/1979 | Stingelin | B23K 9/164 | 219/137 R |
| 4,263,497 A | 4/1981 | Cozzini | | |
| 4,371,107 A | 2/1983 | Watanabe et al. | | |
| 4,631,386 A | 12/1986 | Slavens | | |
| 4,654,500 A * | 3/1987 | Stiles | B23K 9/0061 | 219/105 |
| 4,670,821 A | 6/1987 | Treadway | | |
| 5,241,154 A * | 8/1993 | Estrate | B23K 9/32 | 219/136 |
| 5,685,771 A * | 11/1997 | Kleppen | B08B 15/026 | 219/72 |
| 6,172,334 B1 | 1/2001 | Harris et al. | | |
| 6,328,709 B1 * | 12/2001 | Hung | A61B 5/4312 | 604/514 |
| 6,367,518 B2 * | 4/2002 | Duncan | B08B 17/00 | 134/201 |
| 6,506,995 B1 * | 1/2003 | Fusaro, Jr. | B23K 9/0061 | 219/121.45 |
| 6,555,779 B1 * | 4/2003 | Obana | B23K 9/0061 | 219/121.63 |
| 6,614,409 B1 * | 9/2003 | Bae | A61F 9/065 | 2/8.7 |
| 6,935,341 B2 * | 8/2005 | Musso | A61B 46/00 | 128/849 |
| 7,029,136 B2 | 4/2006 | Hsu | | |
| 7,038,161 B2 * | 5/2006 | Aubry | B23K 26/0665 | 219/121.63 |
| 7,119,301 B2 * | 10/2006 | Langley | B23K 9/0061 | 219/72 |
| 7,126,085 B1 | 10/2006 | Boehme | | |
| 7,129,436 B1 * | 10/2006 | Corne | B23K 20/233 | 219/72 |
| 7,186,950 B1 * | 3/2007 | Fisher | B23K 9/32 | 219/136 |
| 7,220,935 B2 * | 5/2007 | Ireland | B23K 9/293 | 219/74 |
| 7,534,005 B1 * | 5/2009 | Buckman | A61F 9/068 | 2/8.2 |
| 8,362,395 B1 * | 1/2013 | Cummings | B23K 9/321 | 219/136 |
| 8,723,071 B2 * | 5/2014 | Clark | B23K 9/162 | 219/72 |
| 10,232,459 B2 * | 3/2019 | Hoffman | B23K 9/325 | |
| 2001/0025837 A1 * | 10/2001 | Zamuner | B23K 9/28 | 219/137.31 |
| 2006/0226135 A1 * | 10/2006 | Zamuner | B23K 9/28 | 219/137.31 |
| 2007/0068912 A1 * | 3/2007 | Zamuner | B23K 9/28 | 219/137.31 |
| 2009/0139967 A1 * | 6/2009 | Baker | B23K 26/0096 | 219/121.63 |
| 2009/0188895 A1 * | 7/2009 | Mizo | B23K 9/0209 | 219/73.2 |
| 2009/0230107 A1 * | 9/2009 | Ertmer | B23K 9/126 | 219/136 |
| 2011/0159918 A1 * | 6/2011 | Huh | A61F 9/067 | 455/556.1 |
| 2012/0097649 A1 * | 4/2012 | Dawson | A41D 13/084 | 219/121.64 |
| 2012/0255939 A1 * | 10/2012 | Osicki | B23K 9/321 | 219/136 |
| 2013/0026150 A1 * | 1/2013 | Chantry | A61F 9/067 | 219/136 |
| 2013/0277344 A1 * | 10/2013 | Guymon | B23K 5/18 | 219/125.1 |
| 2013/0291271 A1 * | 11/2013 | Becker | G06F 3/005 | 2/8.2 |
| 2013/0341313 A1 * | 12/2013 | Himmelsbach | B23K 26/127 | 219/121.86 |
| 2015/0048057 A1 * | 2/2015 | Wada | B23K 9/167 | 219/75 |
| 2016/0175972 A1 * | 6/2016 | Denis | B23K 9/1087 | 219/132 |
| 2017/0014991 A1 * | 1/2017 | Fuentes | B25H 5/00 | |

* cited by examiner

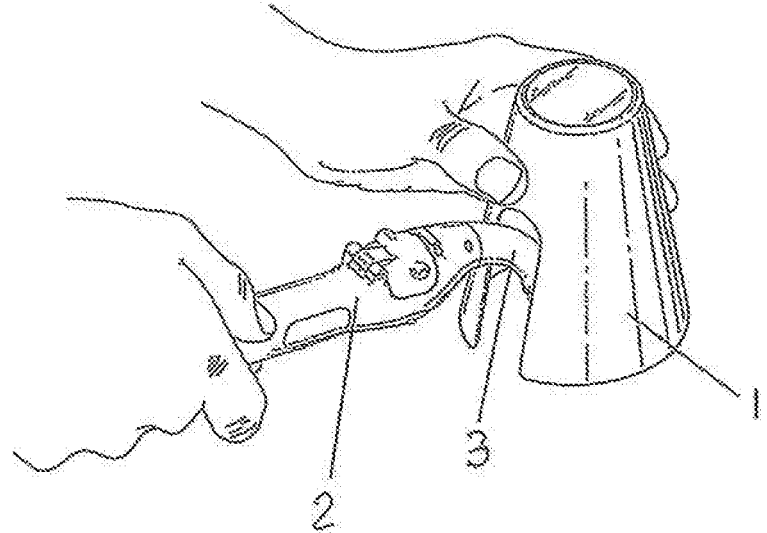
Prior Art Fig. 1
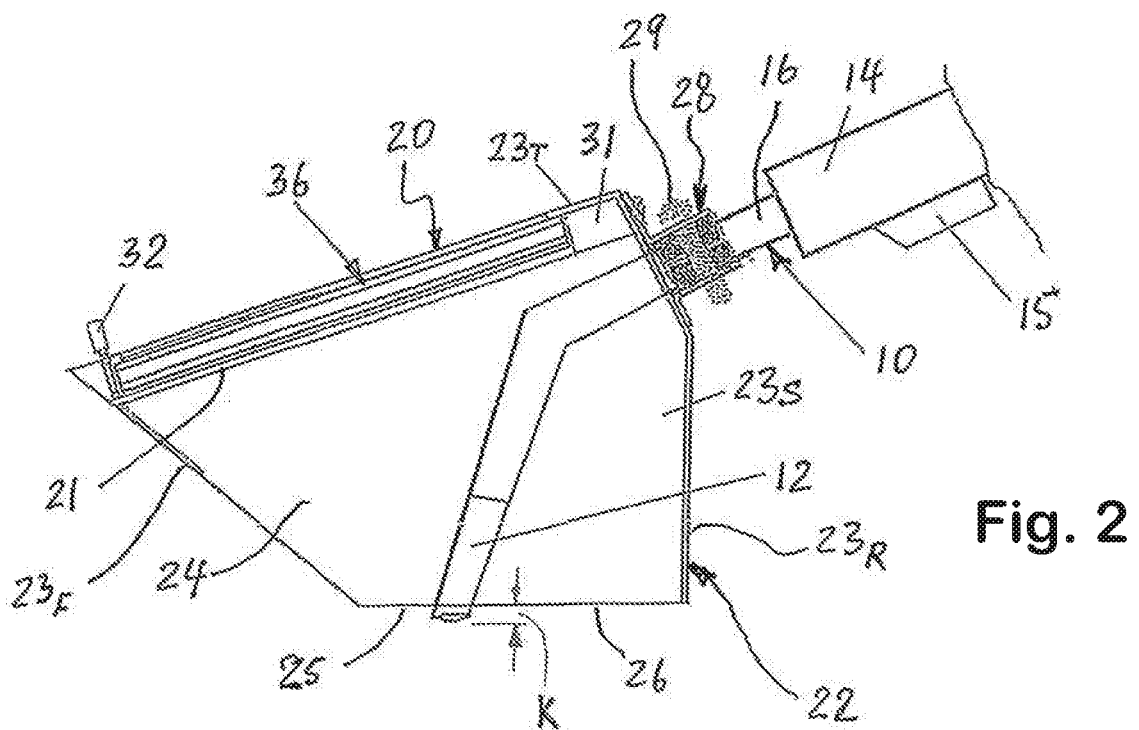
Fig. 2

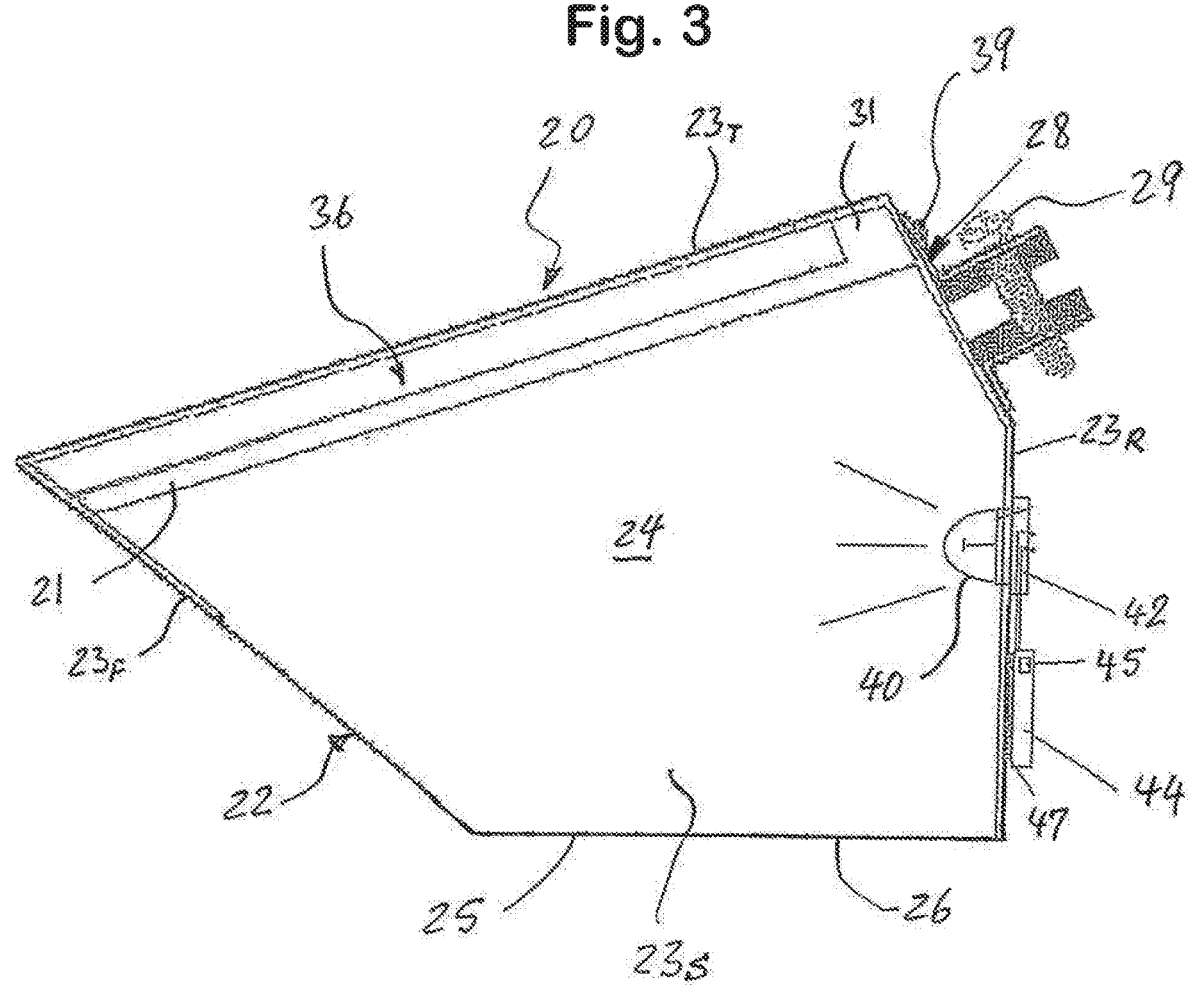

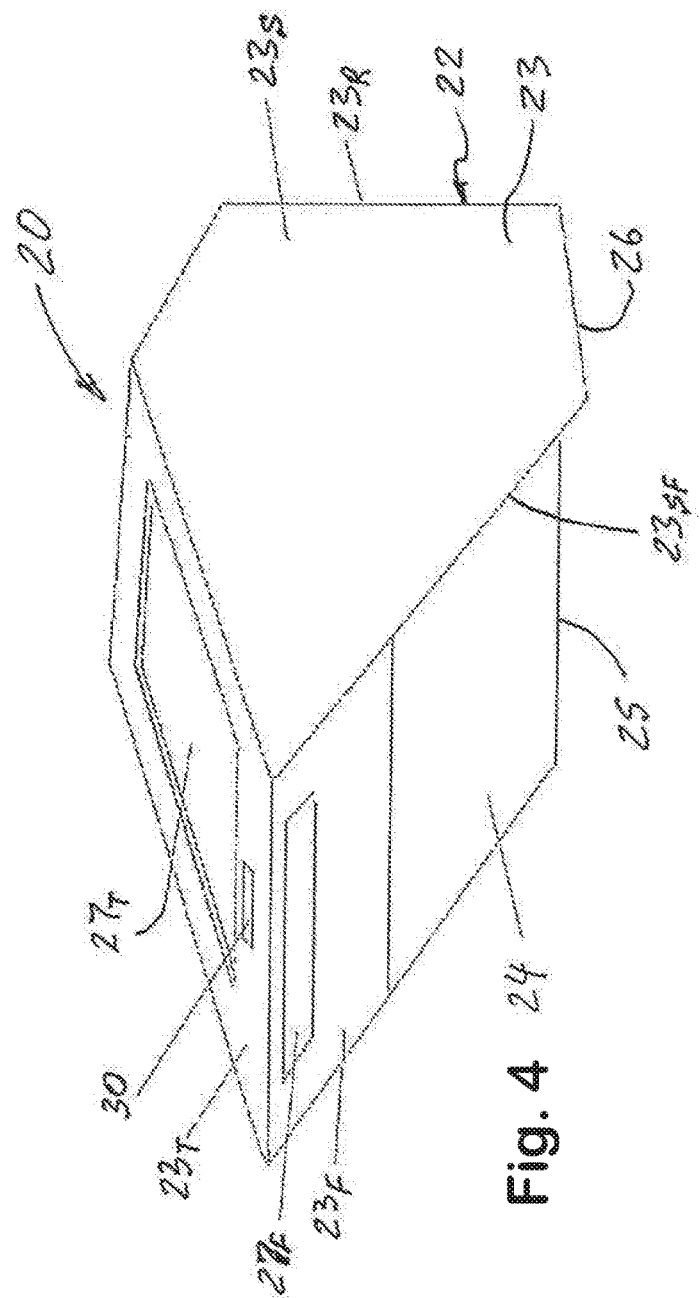
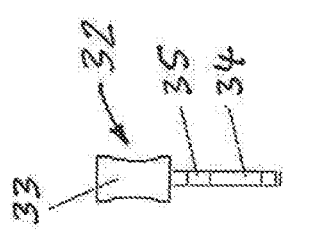
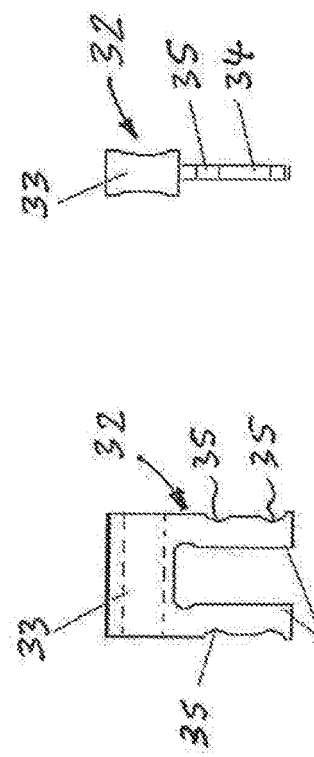

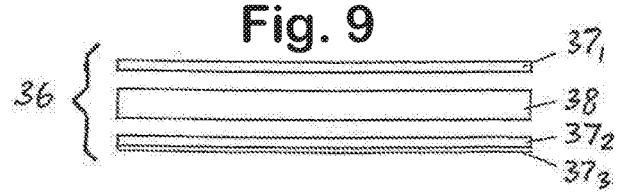
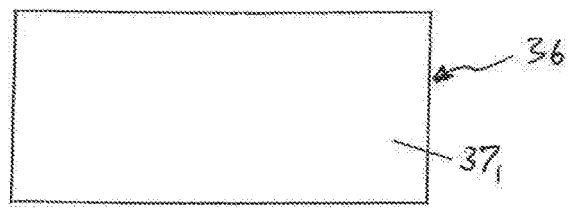
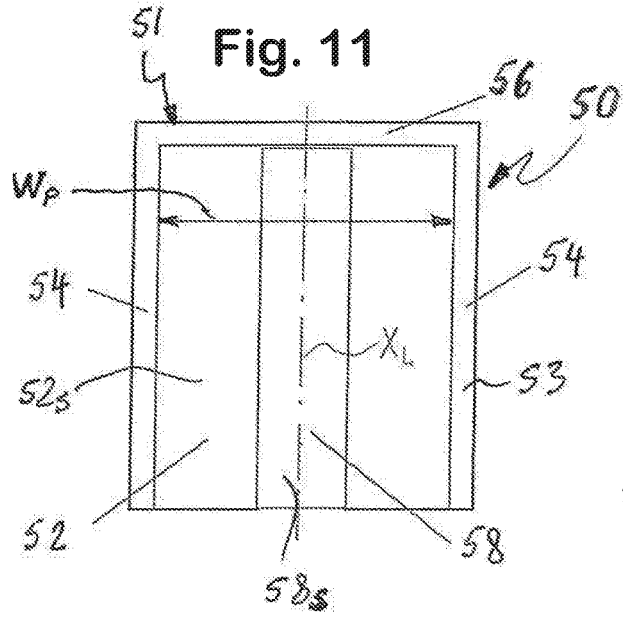
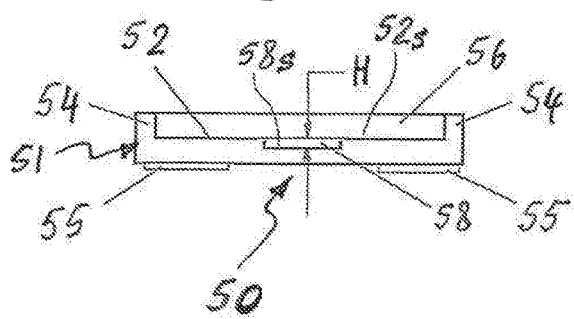

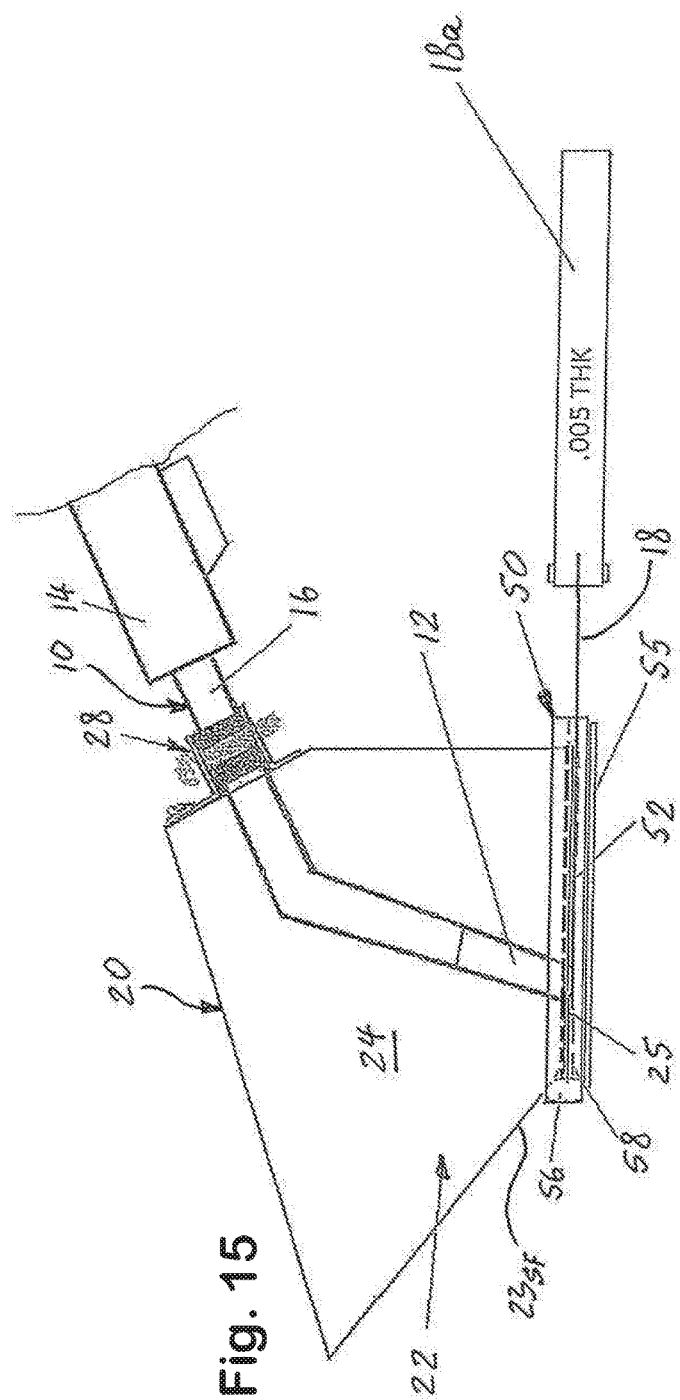
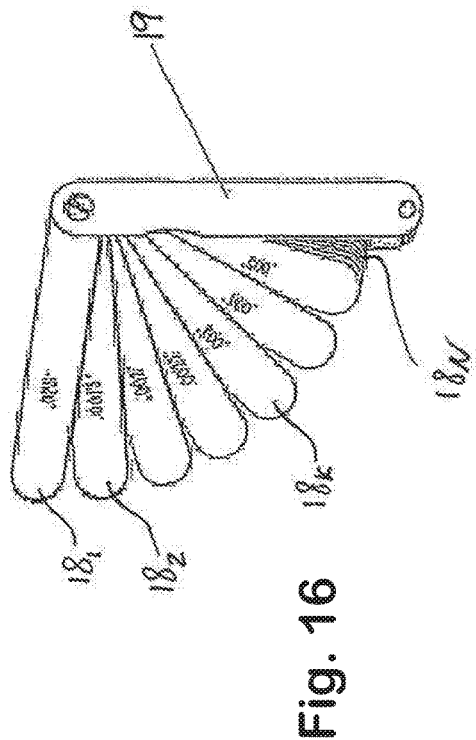

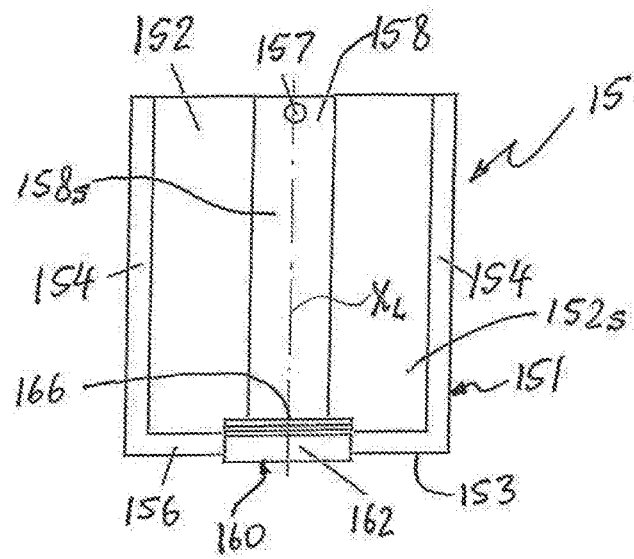
Fig. 21
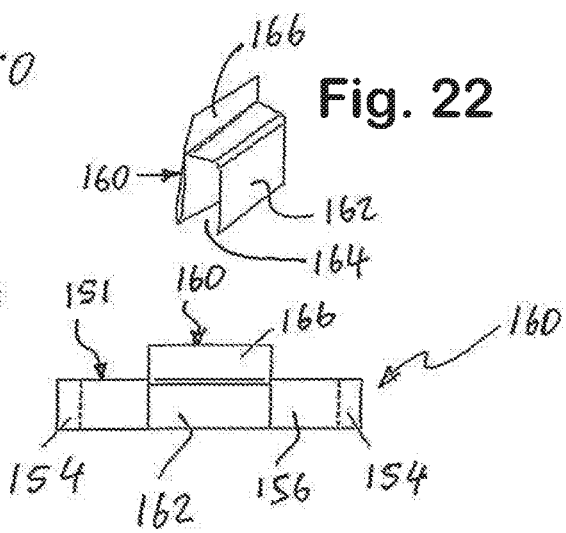
Fig. 22
Fig. 23
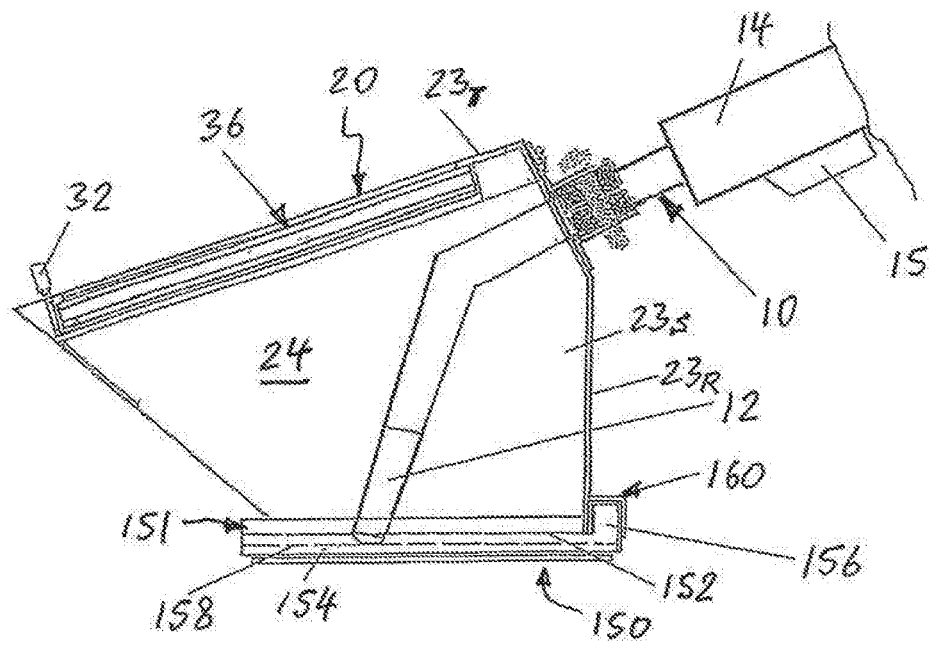
Fig. 24

PLATFORM BASE AND STAND ADJUSTING DEVICE USED IN COMBINATION WITH A WELDERS SHIELD ENCLOSURE AND WELDER'S GUN AND/OR TORCH

BACKGROUND OF THE INVENTION

1. Field of the Invention

The present invention generally relates to welding, and more particularly to a protective welding shield and an adjusting device for calibrating, adjusting and presetting a height or depth of a welding tool tip relative to the protective welding shield.

2. Description of the Related Art

At present there are no known adjusting devices for adjusting, calibrating and presetting a height and/or depth of a welding tip of a welding tool, such as a welding gun tip or torch tip, in relation to a bottom edge of a hollow welding shield that serves to protect welder's eyes, face and hands from sparks, heat and weld splatter. In order to do so without the aid of a welding tip adjusting device, one would have to do guess work and judge by the naked eye, basically free hand to perform such adjustments with little to no accuracy.

Usually, the welding shields are limited to some protection from sparks, heat and weld splatter and offer little to no protection from injury do to bright light transmissions exposure. In most cases it is necessary to utilize a welding helmet to perform welding in conjunction with the welding shield to protect one's face from sparks and additionally have filtered lenses and/or filtered glasses for eye protection from bright light transmissions. Typically, the welding shields that are used to weld with, limit a welder's view in ambient light whereas, the welding tool is concealed by a dark tinted filtering media of the welding shield making it impossible to see the welding tool and a start point of the weld area. A welder has to blind guess where a welding tool tip is and a starting mark. It is only till the welder strikes an arc and is actually welding that he/she can see the welding tool and the weld area. Furthermore, a typical welding shield, as shown in FIG. 1 and disclosed in U.S. Pat. No. 8,362,395, is cumbersome to use and the welder must use two hands in order to weld with: one hand to hold and move a welding shield 1 and the other hand to hold a welding tool 2. A welding tip 3 of the welding tool 2 is disposed within the hollow welding shield 1. Because of limitations by individual design and function the typical welding shields are not economical and/or user friendly for the welder because they do not offer any interchangeability and interface to the standard welding equipment and apparatus used worldwide today.

While existing welding shields and welding tool adjustment devices have proven to be useful for various welding applications and conditions, improvements that may enhance their performance and ease of use, and reduce cost are possible.

BRIEF SUMMARY OF THE INVENTION

According to a first aspect of the invention, there is provided a combination of a protective welding shield with a welding tool and an adjusting device for calibrating, adjusting and/or presetting a position of a welding tip of the welding tool relative to the protective welding shield. The protective welding shield has a central longitudinal axis and comprises a hollow welding shield body having an outer wall defining a welding enclosure for housing the welding tip of the welding tool, a weld viewer mounted to the welding shield body and including at least one welding filter plate, and a fastening device for adjustably securing the welding tool to the welding shield body. The outer wall has a bottom edge defining the open bottom of the protective welding shield. The adjusting device includes a platform base having a central longitudinal axis and comprising a floor member, a wall member extending outwardly from and surrounding the floor member, and a sub-floor slot formed in the floor member and extending substantially coaxially with the central longitudinal axis of the platform base. The sub-floor slot has a substantially planar sub-floor surface spaced inwardly from a substantially planar floor surface of the floor member in the direction orthogonal to the floor surface. The outer wall of the protective welding shield is configured to be mounted to the floor member of the platform base so that the bottom edge of the welding shield body is disposed within the wall member of the platform base and the welding tip of the welding tool faces the sub-floor slot of the platform base.

According to a second aspect of the invention, there is provided an adjusting device for calibrating, adjusting and/ or presetting a position of a welding tip of a welding tool relative to a protective welding shield. The adjusting device comprising a platform base has a central longitudinal axis and comprises a floor member, a wall member extending outwardly from and surrounding the floor member, and a sub-floor slot formed in the floor member and extending substantially coaxially with the central longitudinal axis of the platform base. The sub-floor slot has a sub-floor surface spaced inwardly from a floor surface of the floor member in the direction orthogonal to the floor surface.

A third aspect of the invention provides a method for adjusting a position of a welding tip of a welding tool relative to a protective welding shield. The method involves providing the protective welding shield and an adjusting device for adjusting the position of the welding tip of the welding tool relative to the protective welding shield. The protective welding shield comprises a hollow welding shield body having an outer wall defining a welding enclosure housing the welding tip of the welding tool, a weld viewer mounted to the welding shield body and including at least one welding filter plate, and a fastening device for adjustably securing the welding tool to the welding shield body. The outer wall having a bottom edge defines the open bottom of the protective welding shield. The adjusting device includes a platform base, which has a central longitudinal axis and comprises a floor member, a wall member extending outwardly from and surrounding the floor member, and a sub-floor slot formed in the floor member and extending substantially coaxially with the central longitudinal axis of the platform base. The sub-floor slot has a sub-floor surface spaced inwardly from a floor surface of the floor member in the direction orthogonal to the floor surface. The outer wall of the protective welding shield is configured to be mounted to the floor member of the platform base so that the bottom edge of the welding shield body is disposed within the wall member of the platform base and the welding tip of the welding tool faces the sub-floor slot of the platform base. The method further involves mounting the welding shield body of the protective welding shield on the floor member of the platform base such that the bottom edge of the welding shield body engages the floor member of the platform base within the wall member of the platform base, inserting the welding tool into the welding enclosure of the protective welding shield, displacing the welding tool toward the sub-floor slot of the platform base until the welding tip engages the sub-floor surface of the sub-floor slot, and securing the welding tool to the welding shield body with the fastening device.

Other aspects of the invention, including apparatus, devices, systems, coupling devices, converters, processes, and the like which constitute part of the invention, will become more apparent upon reading the following detailed description of the exemplary embodiments.

BRIEF DESCRIPTION OF THE SEVERAL VIEWS OF THE DRAWING(S)

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, in which like elements are given the same or analogous reference numerals and wherein:

FIG. 1 is a perspective view of a protective welding shield of the prior art;

FIG. 2 is a sectional side view of a protective welding shield in accordance with an exemplary embodiment of the present invention, and a welding tool attached thereto;

FIG. 3 is a sectional side view of the protective welding shield in accordance with the exemplary embodiment of the present invention without the welding tool attached thereto;

FIG. 4 is a perspective view of a welding shield body of the protective welding shield in accordance with the exemplary embodiment of the present invention;

FIG. 5A is a front view of a removable retainer clip of the protective welding shield in accordance with the exemplary embodiment of the present invention;

FIG. 5B is a side view of the removable retainer clip of the protective welding shield in accordance with the exemplary embodiment of the present invention;

FIG. 9 is an exploded side view of welder plates and a standard auto darkening lens of the protective welding shield in accordance with the exemplary embodiment of the present invention;

FIG. 10 is a top view of the welder plate of the protective welding shield in accordance with the exemplary embodiment of the present invention;

FIG. 11 is a top view of a platform base of a welding tip adjusting device in accordance with a first exemplary embodiment of the present invention;

FIG. 12 is a rear view of the platform base in accordance with the first exemplary embodiment of the present invention;

FIG. 15 is a sectional side view of the platform base with the protective welding shield mounted on the platform base in accordance with the first exemplary embodiment of the present invention, the welding tool attached to the protective welding shield and a calibration shim;

FIG. 16 is a perspective view of a set of feeler gages used in conjunction with the platform base and the protective welding shield in accordance with the present invention;

FIG. 21 is a top view of a platform base of a welding tip adjusting device in accordance with a second exemplary embodiment of the present invention;

FIG. 22 is a perspective view of a saddle clip of the welding tip adjusting device in accordance with the second exemplary embodiment of the present invention;

FIG. 23 is a rear view of the platform base of the welding tip adjusting device in accordance with the second exemplary embodiment of the present invention;

FIG. 24 is a sectional side view of the welding tip adjusting device in accordance with the second exemplary embodiment of the present invention, and the protective welding shield of the exemplary embodiment disposed on the welding tip adjusting device of the second exemplary embodiment, and the welding tool attached to the protective welding shield;

Figure 6:
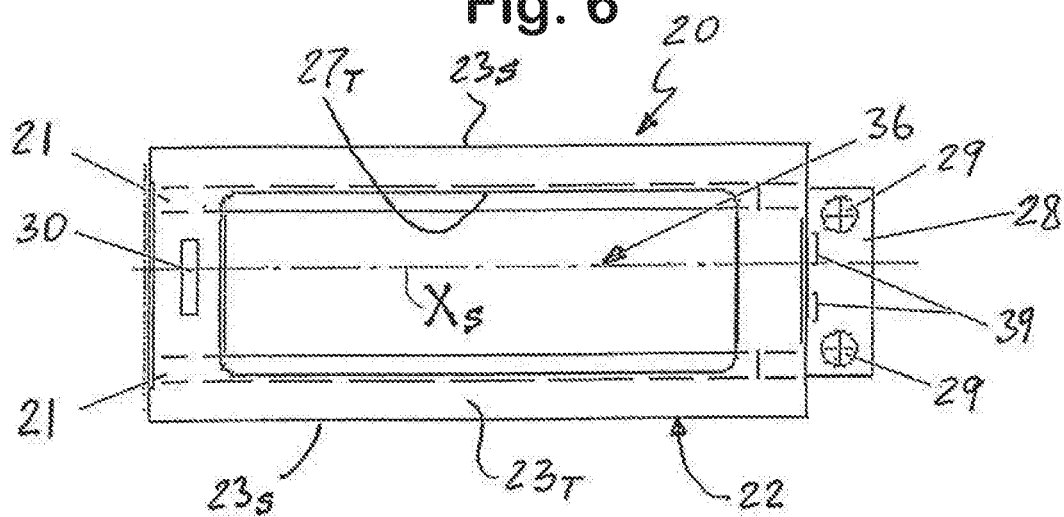
FIG. 6 is a top view of the protective welding shield in accordance with the exemplary embodiment of the present invention.

DETAILED DESCRIPTION OF EXEMPLARY EMBODIMENT(S) AND EMBODIED METHOD(S) OF THE INVENTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper", "lower", "right", "left", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Additionally, the words "a" and "an" as used in the claims means "at least one."

FIG. 2 of the accompanying drawings illustrates a welding tool 10 used in combination with a protective welding shield 20 according to an exemplary embodiment of the present invention illustrated in FIGS. 2-10. The welding tool 10 may be in the form of a gas metal arc welding (GMAW), sometimes referred to by its subtypes: metal inert gas (MIG) welding or metal active gas (MAG) welding, in which an electric arc forms between a consumable wire electrode and the workpiece metal(s), which heats the workpiece metal(s), causing them to melt, and join. The welding tool 10 has a welding tip 12 (such as a welding gun tip or torch tip), a handle 14 provided with a trigger 15, and a neck portion 16 disposed between the welding tip 12 and the welding tool handle 14.

The protective welding shield 20 in accordance with the exemplary embodiment of the present invention comprises a hollow welding shield body 22 and a fastening device, such as a clamp 28, for adjustably securing the welding tool 10 to the welding shield body 22. The clamp 28 is configured to for securely and firmly engaging the neck portion 16 of the welding tool 10 in order to lock the welding tool 10 in place relative to the welding shield body 22 by tightening the clamp 28 with screws 29 best shown in FIGS. 2, 3, 6 and 8.

Figure 7:
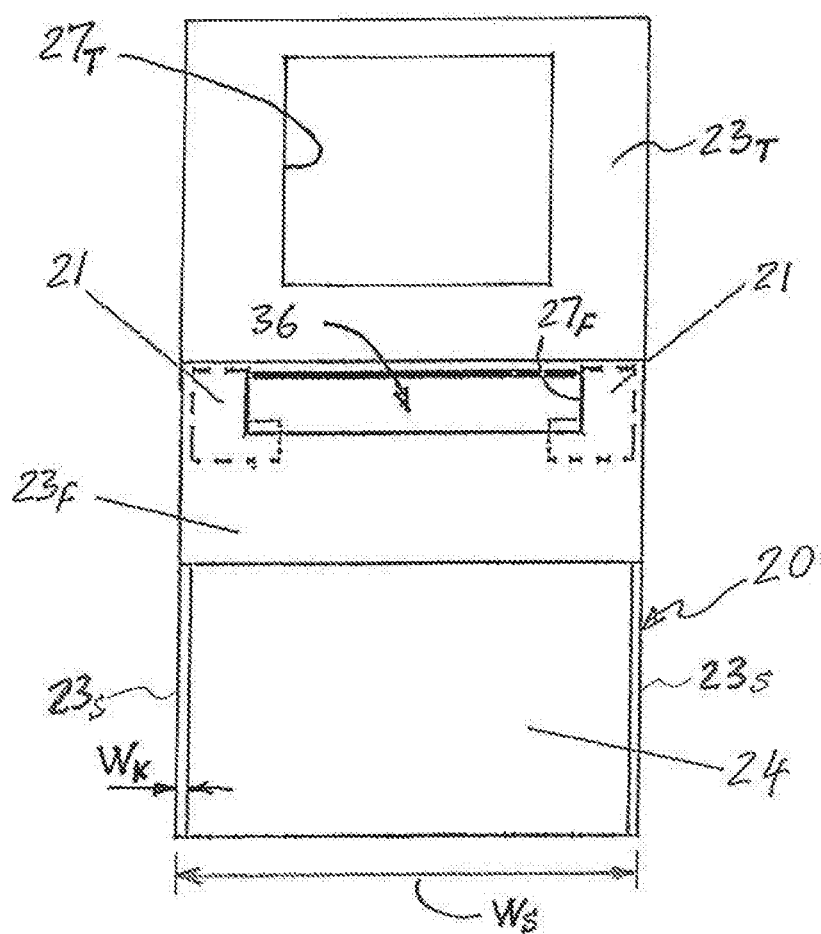
FIG. 7 is a front view of the protective welding shield in accordance with the exemplary embodiment of the present invention.

The welding shield body 22 defines a welding enclosure 24 and an open bottom 26. As best shown in FIGS. 3, 4 and 6-8, the welding shield body 22 includes opposite sidewalls $23_S$, a rear wall $23_R$, a top wall $23_T$ and a front wall $23_F$ together defining an outer wall 23 of the welding shield body 22. The welding shield body 22 has a bottom edge 25 defining the open bottom 26 of the welding shield 20. The top wall $23_T$ has a viewer window opening $27_T$ therethrough, while the front wall $23_F$ has an access slot $27_F$ therethrough. As best shown in FIGS. 6 and 7, the sidewalls $23_S$ extend substantially parallel to a central longitudinal axis $X_S$ of the protective welding shield 20. Further according to the exemplary embodiment of the present invention, the sidewalls $23_S$ are substantially parallel to each other and substantially coaxially with the central longitudinal axis $X_S$, while the rear wall $23_R$ is substantially perpendicular to the sidewalls $23_S$ and the central longitudinal axis $X_S$. As best shown in FIGS. 2, 3, 6 and 8, the fastening device 28 is mounted to the rear wall $23_R$ of the welding shield body 22 by mounting screws 39.

The protective welding shield 20 further includes a substantially rectangular weld viewer 36 mounted to the welding shield body 22 within the welding enclosure 24, as best shown in FIGS. 2, 6 and 24. As best shown in FIGS. 9 and 10, the weld viewer 36 includes substantially rectangular auto-darkening filter lens 38 and one or more substantially rectangular standard passive welding filter plates (or lenses) $37_1$, $37_2$ and $37_3$ that are stacked one on another. The protective welding shield 20 also includes a pair of opposite rail portions 21 mounted to the welding shield body 22 within the welding enclosure 24 adjacent to the access slot $27_F$ as best shown in FIGS. 2-4, 6 and 7. The rectangular weld viewer 36 is configured to slide onto the rail portions 21 through the access slot $27_F$ in the front wall $23_F$ of the welding shield body 22 all the way up to a rail back stop 31.

Figure 17:
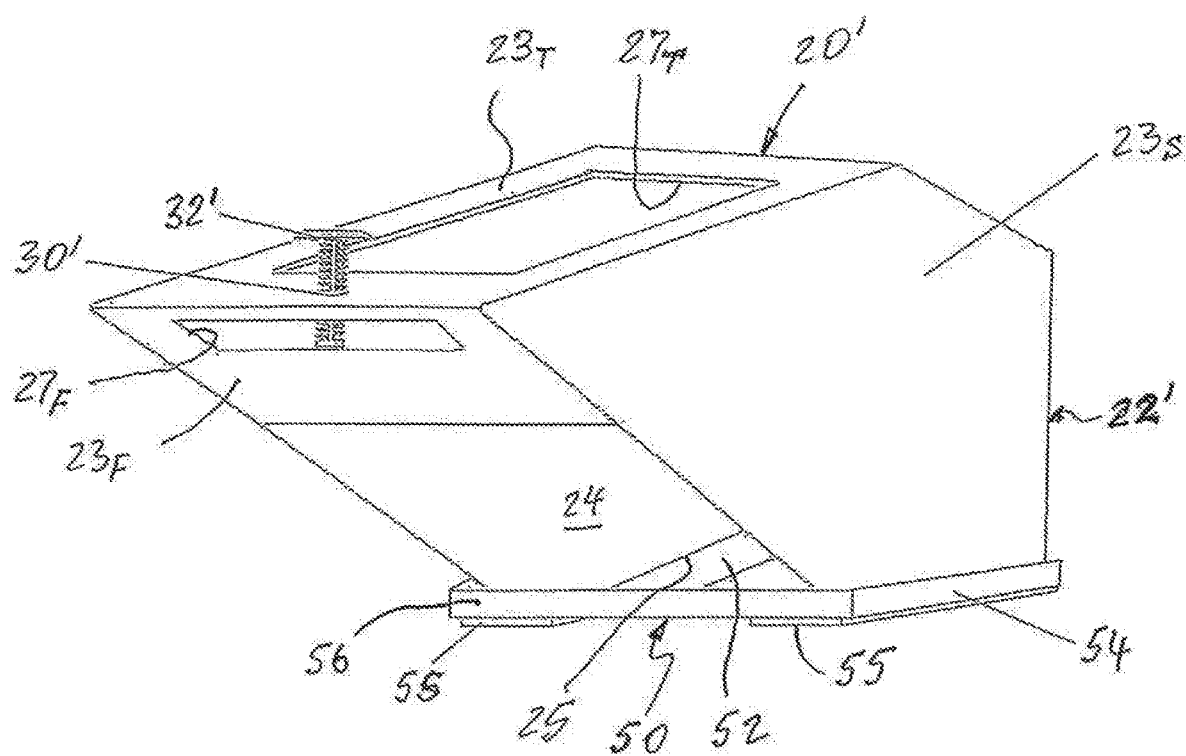
FIG. 17 is a perspective view of a protective welding shield according to an alternative exemplary embodiment of the present invention mounted on the platform base in accordance with the first exemplary embodiment of the present invention.

The protective welding shield 20 further includes a locking mechanism, such as a removable retainer clip 32 mounted into a retainer slot 30 through the top wall $23_T$ of the welding shield body 22 to contain the weld viewer 36 firmly inside the welding enclosure 24 on the rail portions 21 as shown in FIGS. 2 and 4-5B. As best shown in FIGS. 5A-5B, the retainer clip 32 includes a central portion 33 and a pair of leg portions 34 outwardly extending from the central portion 33. As best shown in FIG. 5A, each of the leg portions 34 has recessed or cutout portions 35 for easily engaging the retainer 30 and also for increasing the elasticity of the leg portions 34. Alternately, a removable fastener 32' is used as the locking mechanism. The removable fastener 32' is received into a retainer hole 30' through the top wall $23_T$ of the welding shield body 22, as shown in FIG. 17.

Figure 8:
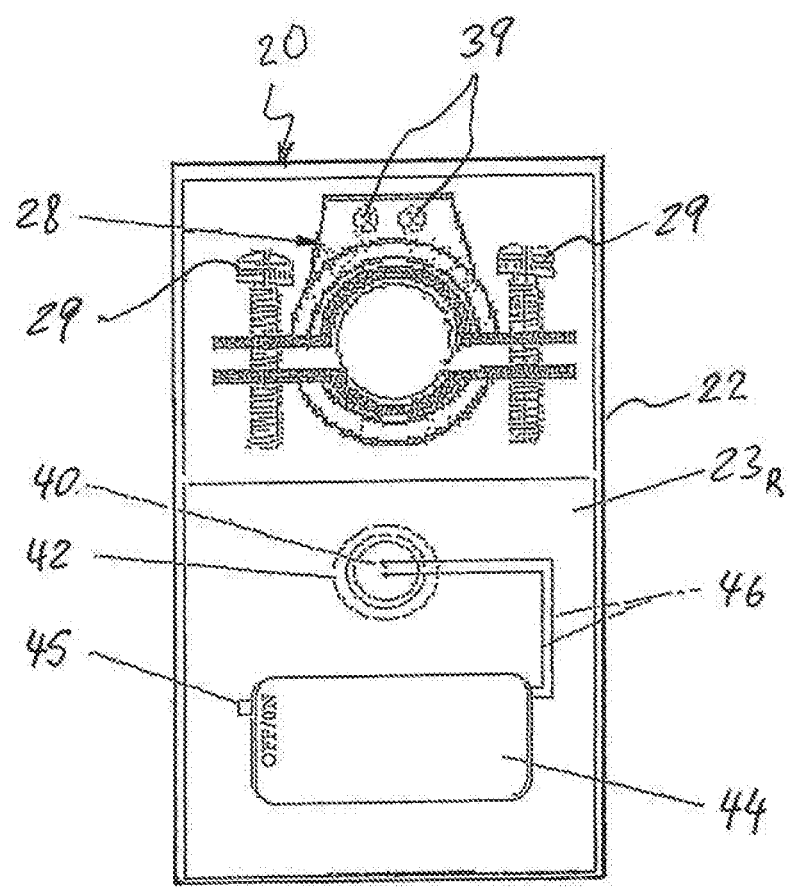
FIG. 8 is a rear view of the protective welding shield in accordance with the exemplary embodiment of the present invention.
Figure 18:
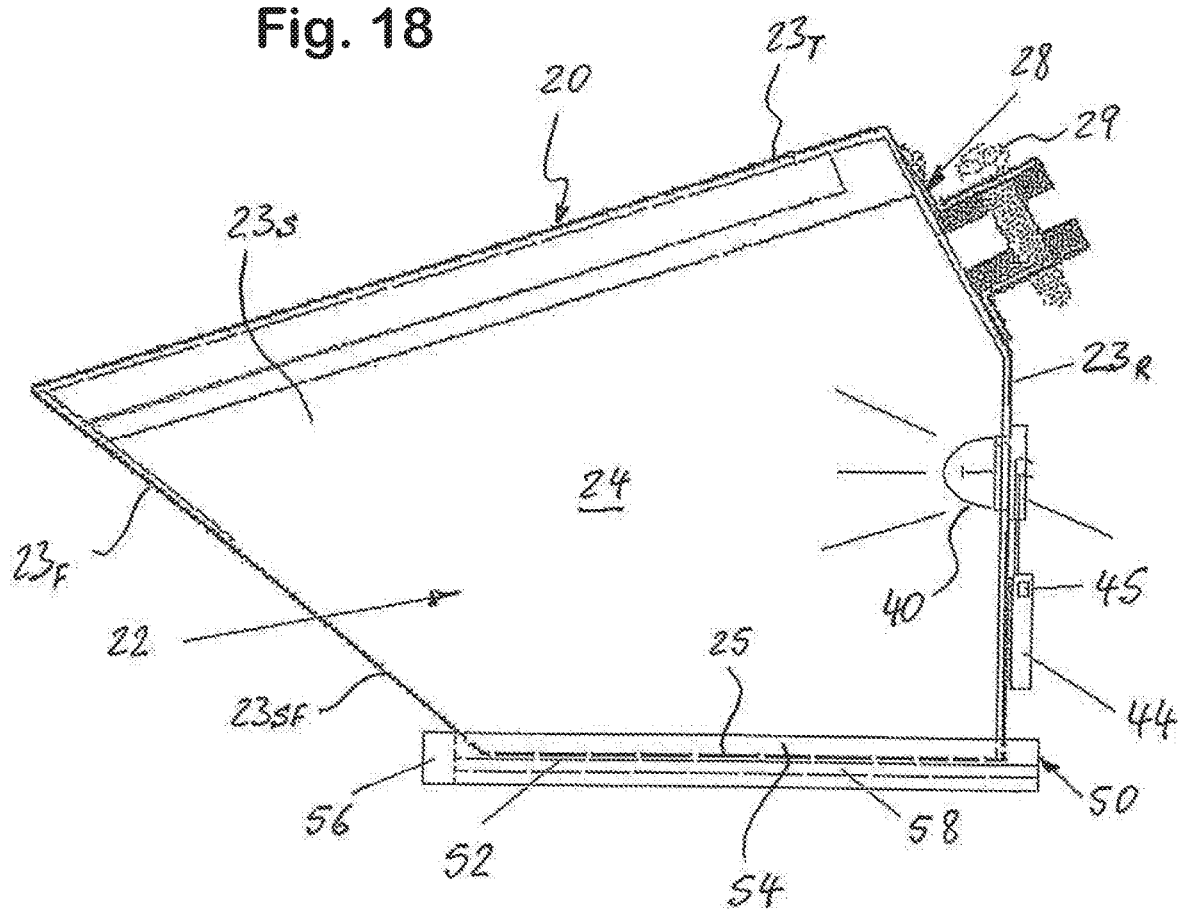
FIG. 18 is a sectional side view of the platform base in accordance with the first exemplary embodiment of the present invention, and the protective welding shield of the exemplary embodiment disposed on the platform base of the first exemplary embodiment, without the welding tool attached to the protective welding shield.
Figure 19:
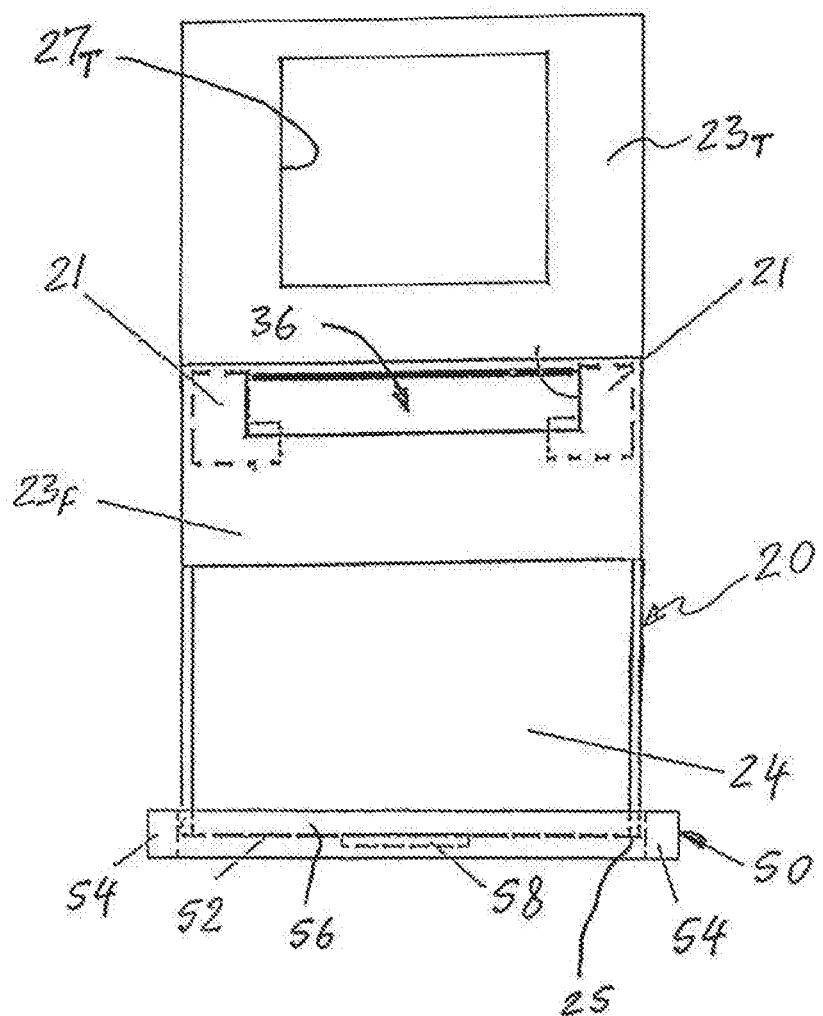
FIG. 19 is a front view of the protective welding shield in accordance with the exemplary embodiment of the present invention mounted on the platform base of the first exemplary embodiment.
Figure 20:
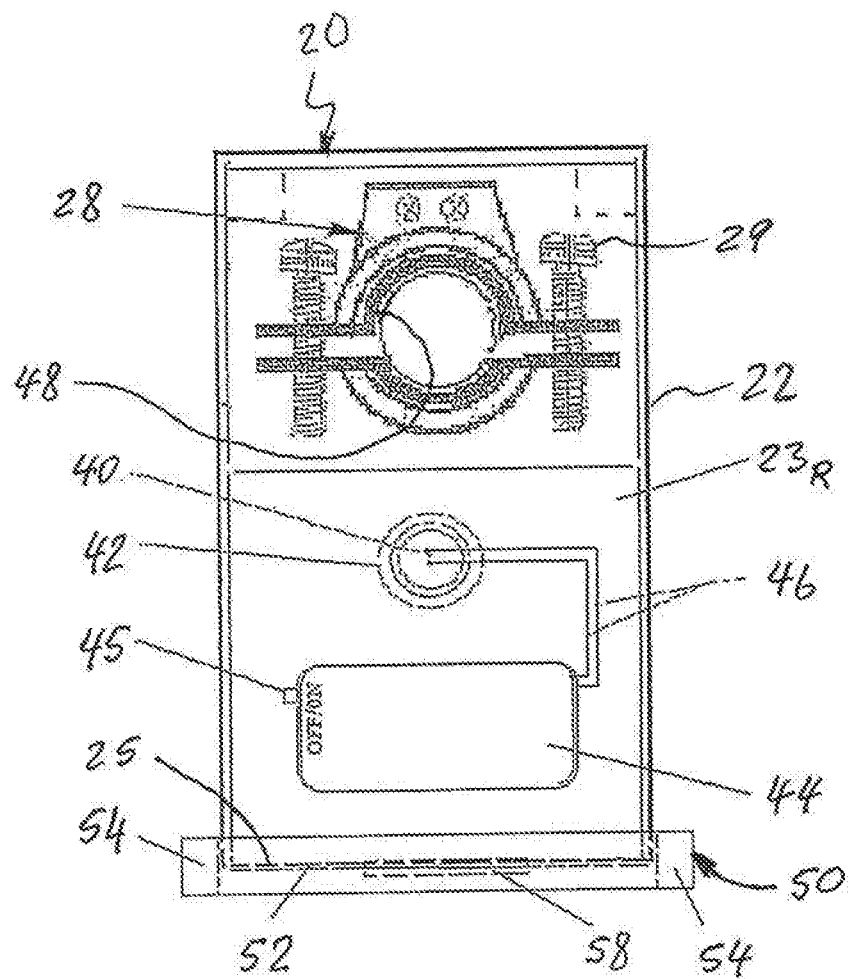
FIG. 20 is a rear view of the protective welding shield in accordance with the exemplary embodiment of the present invention mounted on the platform base of the first exemplary embodiment.

The protective welding shield 20 further comprises an internal illumination lamp 40 disposed within the welding enclosure 24 of the protective welding shield 20 for facilitating visual location of a weld strike prior to welding, as best shown in FIGS. 2, 8 and 18. Specifically, the internal illumination lamp 40 is attached to the rear wall $23_R$ of the welding shield body 22 below the clamp 28 with a grommet 42. A battery pack 44 with an on/off switch 45 containing lead wires 46, which are attached to the illumination lamp 40. The battery pack 44 is attached to the rear wall $23_R$ of the welding shield body 22 with a layer of adhesive 47. The illumination device, preferably, in the form of an LED. It will be appreciated that the illumination lamp 40 can be of any appropriate type known in the art, such as incandescent, fluorescent, halogen, HID, LED or similar light source.

FIGS. 11-19 of the accompanying drawings illustrate a first exemplary embodiment of an adjusting device for adjusting, calibrating and/or presetting a height (or depth) K (best shown in FIG. 2) of the welding tip 12 of the welding tool 10, such as a welding gun tip or torch tip, relative to the bottom edge 25 of the welding shield body 22 of the protective welding shield 20. As best illustrated in FIG. 2, the height K of the welding tip 12 of the welding tool 10 relative to the bottom edge 25 of the welding shield body 22 is defined herein as a distance between the welding tip 12 and the bottom edge 25 of the welding shield body 22 of the protective welding shield 20 in the vertical direction, or in the direction perpendicular to the bottom edge 25 of the welding shield body 22.

The welding tool tip adjusting device in accordance with the first exemplary embodiment of the present invention, generally represented in the accompanying drawings by reference numeral 50, includes a platform base 51. The platform base 51 according to the first exemplary embodiment is used in combination with the protective welding shield 20 of the present invention and the welding tool 10.

The platform base 51 includes a floor member 52 surrounded by a wall member 53 formed integrally with the floor member 52 and extending outwardly from the floor member 52. The wall member 53 includes opposite and substantially parallel side walls 54, and a back wall 56, as best shown in FIGS. 11 and 12. As shown in FIG. 11, the side walls 54 extend substantially parallel to a central longitudinal axis $X_L$ of the platform base 51. Furthermore, the side walls 54 and back wall 56 extend outwardly from the floor member 52 substantially perpendicular to the floor member 52. The back wall 56 is substantially perpendicular to the side walls 54 and the central longitudinal axis $X_L$ of the platform base 51. Moreover, the floor member 52 of the platform base 51 is formed with a sub-floor slot 58 (or channel) extending substantially parallel to the side walls 54 and coaxially with the central longitudinal axis $X_L$ of the platform base 51 along substantially an entire length of the floor member 52. The floor member 52 of the platform base 51 has a substantially flat (i.e., planar) floor surface 52s, while the sub-floor slot 58 has a substantially flat (i.e., planar) sub-floor surface (or slotted sub-floor) 58s substantially parallel to the floor surface 52s of the floor member 52. A depth H of the sub-floor slot 58 is defined as a distance between the floor surface 52s and the sub-floor surface 58s in the direction orthogonal to the floor surface 52s of the platform base 51, as best shown in FIG. 12.

The geometric configuration (or shape) of the wall member 53 in a plane parallel to the floor member 52 is substantially identical to the geometric configuration (or shape) of the bottom edge 25 of the welding shield body 22. Specifically, according to the exemplary embodiment, a width $W_S$ of the welding shield body 22 (i.e., a distance between outer surfaces of the sidewalls $23_S$, as shown in FIG. 7) is equal or slightly less (i.e., substantially equal) to a width $W_P$ of the floor member 52 of the platform base 51 (i.e., a distance between inner surfaces of the side walls 54, as best shown in FIG. 11).

Figure 13:
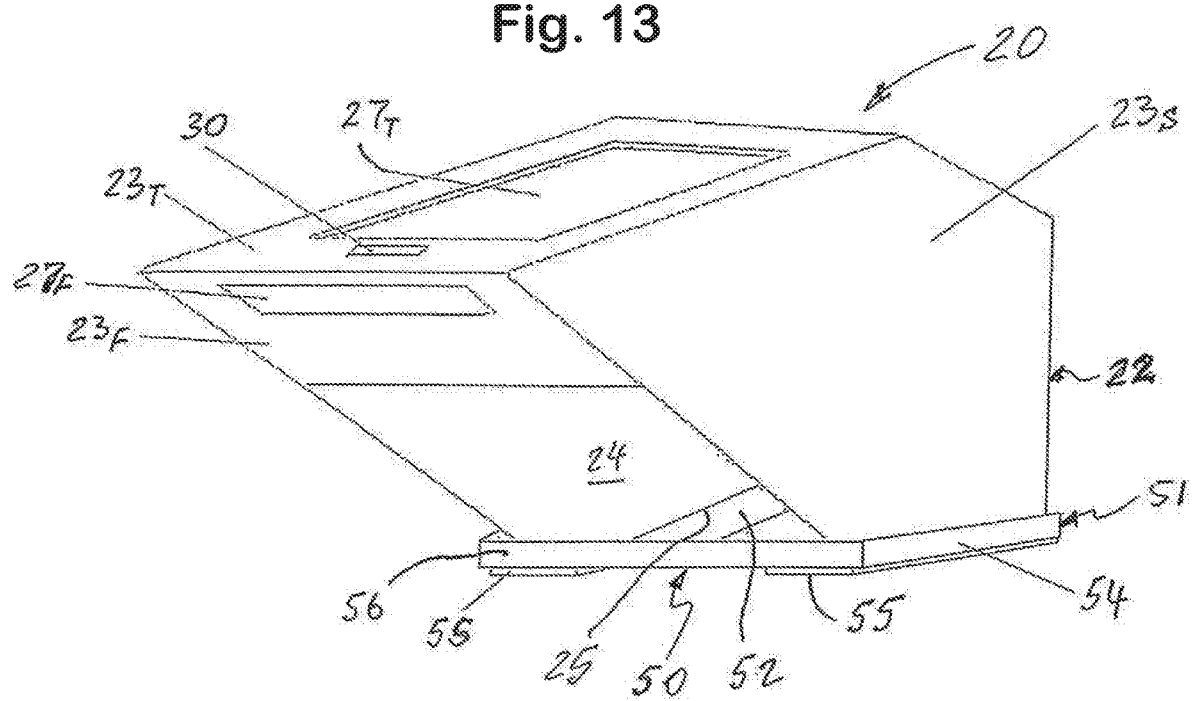
FIG. 13 is a perspective view of the protective welding shield of the exemplary embodiment of the present invention mounted on the platform base in accordance with the first exemplary embodiment of the present invention.

The platform base 51 is intended to rest upon a work table surface. Accordingly, in order to reduce slippage of the platform base 51 relative to the table surface, a bottom surface of the platform base 51 is provided with anti-friction pads 55 formed of textured rubber or other appropriate anti-friction material, as best shown in FIGS. 12-14.

An exemplary method for adjusting, calibrating and/or presetting a height (or depth) of the welding tip 12 of the welding tool 10 relative to the bottom edge 25 of the welding shield body 22 of the protective welding shield 20 using the welding tool tip adjusting device 50 according to the embodiment of FIGS. 11-12 will now be explained. It should be understood that this exemplary method may be practiced in connection with the other embodiments described herein.

In operation, in order to adjust, calibrate and/or preset a height of the welding tip 12 of the welding tool 10 relative to the bottom edge 25 of the welding shield body 22 of the protective welding shield 20, the welding shield body 22 of the protective welding shield 20 is placed (or mounted) on the platform base 51 such that the bottom edge 25 of the welding shield body 22 engages the floor member 52 of the platform base 51. Specifically, the welding shield body 22 of the protective welding shield 20 is placed on the platform base 51 such that the bottom edge 25 of the welding shield body 22 engages the floor member 52 of the platform base 51, the sidewalls $23_S$ are disposed substantially parallel to and within the side walls 54 of the platform base 51, and front edges of the sidewalls $23_S$ engage the back wall 56 of the platform base 51, as best shown in FIGS. 13-20. As the width $W_S$ of the welding shield body 22 is substantially equal to the width $W_P$ of the floor member 52 of the platform base 51, the protective welding shield 20 is registered in transverse direction, i.e., in the direction parallel to the back wall 56 of the platform base 51, when the protective welding shield 20 is placed on the platform base 51 within the side walls 54.

Figure 14:
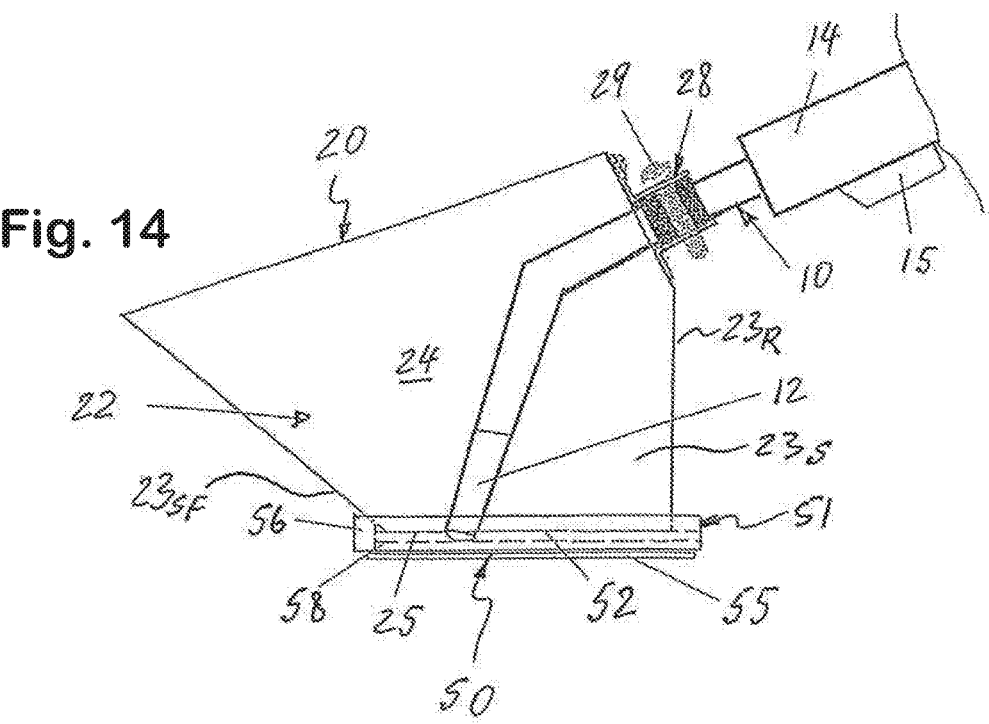
FIG. 14 is a sectional side view of the platform base in accordance with the first exemplary embodiment of the present invention, and the protective welding shield of the exemplary embodiment disposed on the platform base of the first exemplary embodiment, and the welding tool attached to the protective welding shield.

When the protective welding shield 20 is disposed on the platform base 51, the welding tool 10 is inserted and fed through the untightened clamp 28 and then through an aperture 48 (best shown in FIG. 20) until the welding tip 12 touches and engages the sub-floor surface 58s of the sub-floor slot 58 (as best shown in FIG. 14). While holding the welding tool 10 by the handle 14 and with the welding tip 12 kept firmly and steady against the sub-floor slot 58, the welder tightens the clamp 28 with the screws 29 around the neck portion 16 of the welding tool 10 at this position so as to lock the welding tool 10 in place. With the clamp 28 fully tightened, the platform base 51 is removed and the welding gun tip 12 is now adjusted at a proper height in relation to the bottom edge 25 of the protective welding shield 20 substantially equal to the depth H of the sub-floor slot 58 of the platform base 51, best shown in FIG. 12.

Alternatively, if the protective welding shield 20 is placed to the platform base 51 already with the welding tool 10 mounted thereon, then the clamp 28 is first untightened, then the welding tool 10 is moved by the handle 14 until the welding tip 12 touches and engages the sub-floor slot 58 (as best shown in FIG. 14). Next, while holding the welding tool 10 by the handle 14 and with the welding tip 12 kept firmly and steady against the sub-floor slot 58, the welder tightens the clamp 28 with the screws 29 around the neck portion 16 of the welding tool 10 at this position so as to lock the welding tool 10 in place.

FIG. 15 shows the protective welding shield 20 mounted to the platform base 51 so that adjustments are made utilizing a shim 18 (having a predetermined thickness) placed between the welding tip 12 and the sub-floor slot 58. After the neck portion 16 of the welding tool 10 is locked in place, the shim 18 is removed along with the platform base 51, the welding gun tip 12 is calibrated and finely adjusted to a predetermined height relative to the bottom edge 25 of the protective welding shield 20, and is ready to weld. The shim 18 is attached to a shim handle 18a. Alternatively, a set 19 of calibrated feeler gages $18_1, 18_2 \ldots 18_K \ldots 18N$ shown FIG. 16 can be utilized and substituted in lieu of the single shim 18.

Various modifications, changes, and alterations may be practiced with the above-described embodiment of the welding tool tip adjusting device, including but not limited to the additional embodiments shown in FIGS. 21-26. In the interest of brevity, reference characters in FIGS. 21-26 that are discussed above in connection with FIGS. FIGS. 2-20 are not further elaborated upon below, except to the extent necessary or useful to explain the additional embodiments of FIGS. 21-26. Modified components and parts are indicated by the addition of a hundred digits to the reference numerals of the components or parts.

A welding tool tip adjusting device 150 in accordance with a second exemplary embodiment of the present invention includes a platform base 151 and a saddle clip 160. The platform base 151 of FIG. 21 corresponds substantially to the platform base 51 of FIGS. 11-12. Similarly to the platform base 51 of the first exemplary embodiment, the platform base 151 includes a floor member 152 surrounded by a wall member 153 extending outwardly from the floor member 152. The wall member 153 includes opposite and substantially parallel side walls 154, and a back wall 156, as best shown in FIG. 21. The floor member 152 of the platform base 151 is formed with a sub-floor slot 158 coaxial with the central longitudinal axis $X_L$ of the platform base 51 and extending substantially parallel to the side walls 154 of the platform base 151 along substantially an entire length of the floor member 152. The sub-floor slot 158 has a substantially flat (i.e., planar) sub-floor surface (or slotted sub-floor) 158s substantially parallel to a floor surface 152s of the floor member 152.

Adjustments to a height or depth of the welding tip 12 of the welding tool 10 relative to the bottom edge 25 of the welding shield body 22 of the protective welding shield 20 are made in the sub-floor slot 158 of the platform base 151. The sub-floor slot 158 of the platform base 151 is formed with an integral hang hole 157 (shown in FIG. 21) used to hang the adjusting device 150 and/or the adjusting device 150 with the protective welding shield 20 together for storage and/or during a rest period between welding operations.

As best shown in FIG. 22, the saddle clip 160 includes a generally U-shaped clip body 162 defining a U-shaped channel 164, and a retainer member 166 formed integrally with the clip body 162 (preferably as a single-piece part). The retainer member 166 is elastically moveable relative to the clip body 162 so as to define a slot between the clip body 162 and the retainer member 166. The slot between the clip body 162 and the retainer member 166 is configured to receive and elastically clamp the rear wall $23_R$ of the welding shield body 22 of the protective welding shield 20 between the clip body 162 and the retainer member 166 of the saddle clip 160. The U-shaped channel 164 of the clip body 162 of the saddle clip 160 is configured to be mounted and clamped on the back wall 156 of the platform base 151, as shown in FIGS. 21 and 23.

In operation, as illustrated in FIGS. 21 and 23, the saddle clip 160 is mounted to the back wall 156 of the platform base 151, whereas the saddle clip 160 clamps and holds the rear wall $23_R$ of the welding shield body 22 of the protective welding shield 20 between the clip body 162 and the retainer member 166 of the saddle clip 160. In this position, the protective welding shield 20 is held securely on the floor member 152 of the platform base 151 as shown in FIG. 24. The side walls 154 of the platform base 151 provide further stability for placement of the welding shield body 22 of the protective welding shield 20 into the platform base 151.

Figures 25, 26:
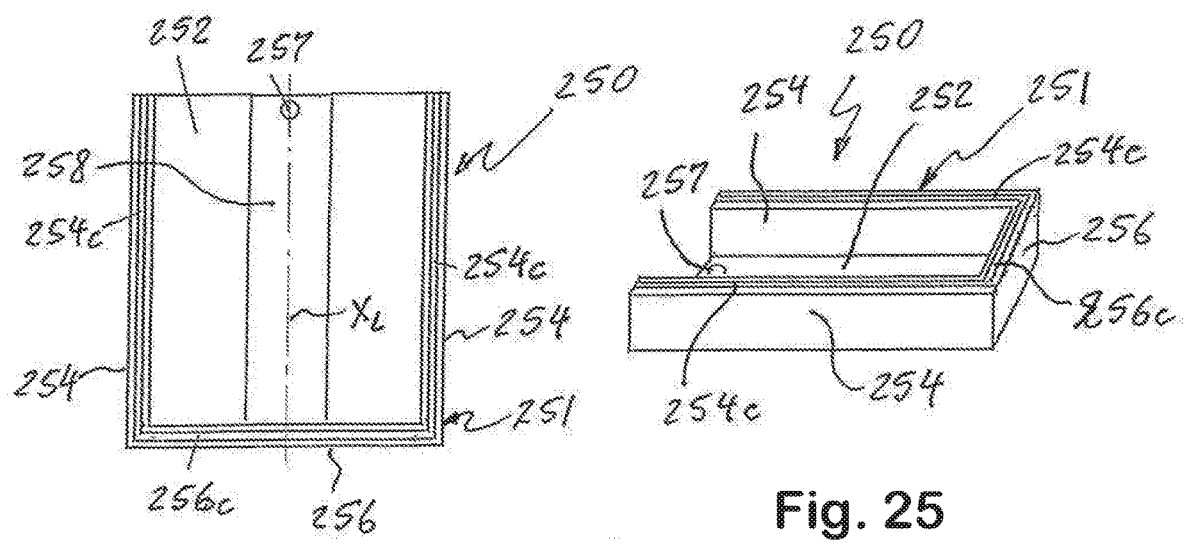
FIG. 25 is a perspective view of the welding tip adjusting device in accordance with the third exemplary embodiment of the present invention.
FIG. 26 is a top view of a platform base of a welding tip adjusting device in accordance with a third exemplary embodiment of the present invention.

A welding tool tip adjusting device 250 in accordance with a third exemplary embodiment of the present invention, illustrated in FIGS. 25-26, includes a platform base 251. The platform base 251 of FIGS. 25-26 corresponds substantially to the platform base 51 of FIGS. 11-12. Similarly to the platform base 51 of the first exemplary embodiment, the platform base 151 includes a floor member 252 surrounded by a wall member 253 extending outwardly from the floor member 252. The wall member 253 includes opposite and substantially parallel gripping side walls 254, and a gripping back wall 256, as best shown in FIGS. 25-26. The floor member 252 of the platform base 251 is formed with a sub-floor slot 258 coaxial with the central longitudinal axis $X_L$ of the platform base 51 and extending substantially parallel to the side walls 254 of the platform base 251 along substantially an entire length of the floor member 252. The platform base 251 further includes an integral hang hole 257 used to hang the platform base 251 or the platform base 251 with the protective welding shield 20 together for storage and/or during a rest period between welding operations.

Each of the gripping side walls 254 includes a gripping side groove (or channel) 254c therein extending along an entire length of each of the gripping side walls 254. Similarly, the gripping back wall 256 includes a gripping back groove (or channel) 256c therein extending along an entire length of each of the gripping back wall 256. The gripping side grooves 254c are open to the gripping back groove 256c so as to define a continuous gripping groove. A width of the gripping groove 254c, 256c in each of the gripping side walls 254 and the gripping back wall 256 is equal or slightly less (i.e., substantially equal) to a width $W_K$ of the outer wall 23 of the welding shield body 22 (i.e., the sidewalls $23_S$ and the rear wall $23_R$ of the welding shield body 22, as best shown in FIG. 7). Accordingly, the protective welding shield 20 is placed on the platform base 251 such that the sidewalls $23_S$ and the rear wall $23_R$ of the welding shield body 22 are inserted into gripping side grooves 254c and the gripping back groove 256c, respectively, of the platform base 251.

In operation, when the protective welding shield 20 is mounted to the platform base 251, the platform base 251 clamps and securely holds the welding shield body 22 of the protective welding shield 20 on the platform base 251 with a secure friction grip as a result of the width of the continuous gripping groove 254c, 256c in each of the gripping side walls 254 and the gripping back wall 256 being substantially equal to the width $W_K$ of the sidewalls $23_S$ and the rear wall $23_R$ of the welding shield body 22.

Figure 27:
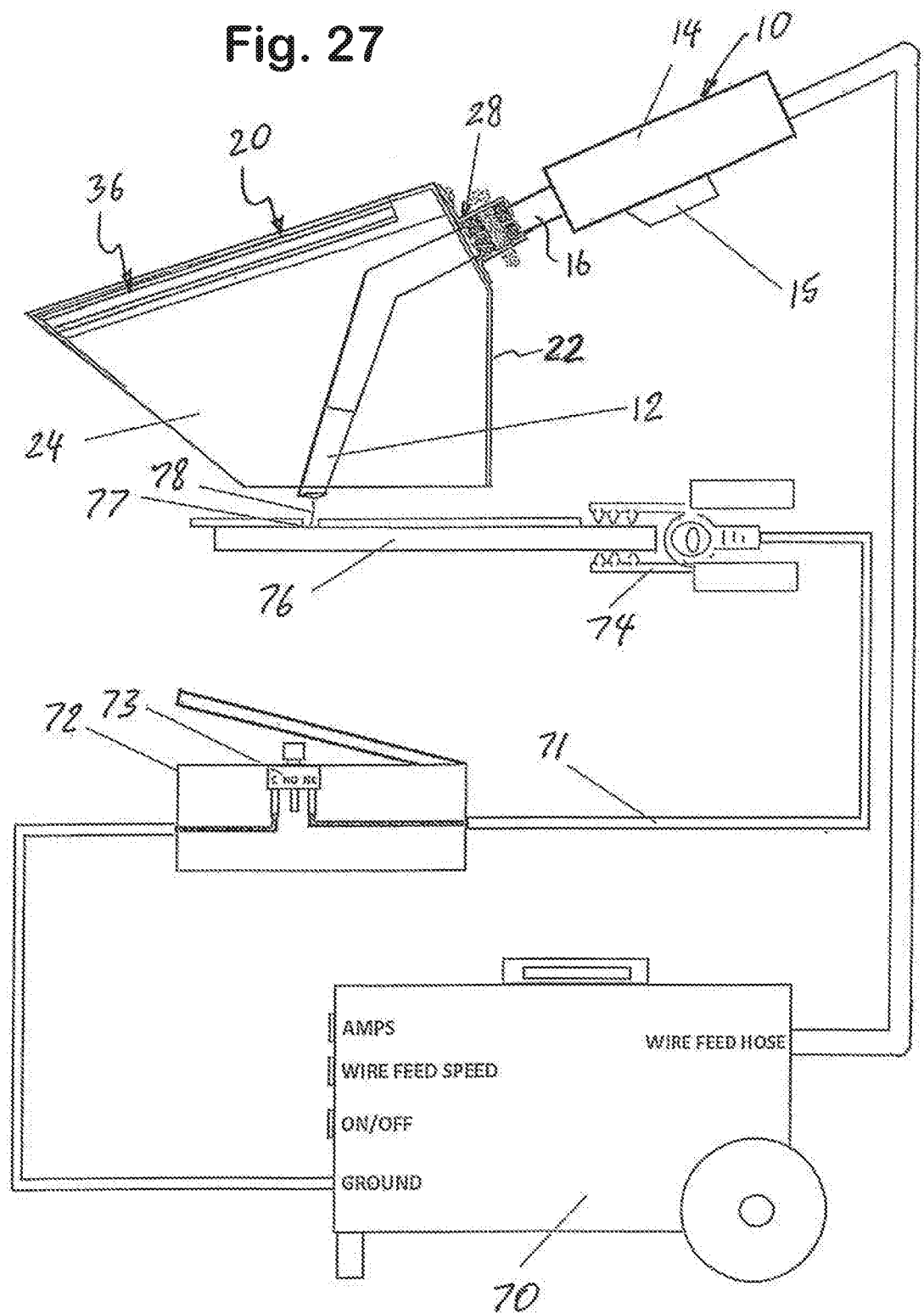
FIG. 27 is a sectional side view of the protective welding shield of the exemplary embodiment of the present invention with the welding tool attached to the protective welding shield in combination with a circuit interruption device.

FIG. 27 of the accompanying drawings illustrate the protective welding shield 20 used with the welding tool 10 in the form of a hand-held metal-inert-gas (MIG) welding gun. The MIG welding gun 10 is electrically connect to a metal-inert-gas (MIG) wire fed welding machine 70. FIG. 27 further illustrates a circuit interruption device 72 that controls start and stop of a weld strike. The circuit interruption device 72 is electrically connected to the MIG welding machine 70 and an alligator clamp 74 with attached ground wire 71. The ground wire 71 is attached to a weld plate 76 via the alligator clamp 74. The height of the welding tip 12 of the MIG welding gun 10 has been adjusted, calibrated and/or preset using the welding tool tip adjusting device 50, 150, 250 according to one of the exemplary embodiments of the present invention.

The protective welding shield 20, shown in FIG. 27, comprises of all the salient elements as described in the exemplary embodiment thereof except a standard passive filter lens is utilized instead of the auto-darkening filter lens 38 in the weld viewer 36. Unlike the auto-darkening lens technology, where the welder can see through the lens prior to welding, the passive filters are a fixed dark shade lens and the welder cannot see through them in the ambient light. To assist the welder in locating a starting mark 77 of the weld plate 76, the circuit interruption device 72, having a switch 73, is utilized in between the MIG welding machine 70 and the ground wire 71 attached to the weld plate 76 via the alligator clamp 74.

With the MIG welding machine 70 turned on, the welder presses and holds down the switch 73 of the circuit interruption device 72 with a welder's hand or foot. This terminates or "kills" the ground activation which and also shunts a weld wire 78 from striking an arc. Now, with continued hold on the switch 73, the welder can see and physically place and make contact with the weld wire 78 onto the precise starting mark 77 of the weld plate 76 without any spark. Once the weld wire 78 is held in place, then the welder's eye focus on the weld viewer 36 with the passive filter lens. The welder then releases the switch 73 of the circuit interruption device 72 and the weld wire 78 is said to become "live" and the first strike and arc is eminent, and the welder proceeds to pull the trigger 15 on the handle 14 of the MIG welding gun 10 advancing the weld wire 78 to continue welding. As long as the weld spark is maintained, the welder will be able to see the weld area, the weld wire 78 and depositing weld media through the passive filter plate of the weld viewer 36.

This process is repeated after every stop and start of a new weld. It can be appreciated that the switch 73 of the circuit interruption device 72 can be electrically wired NO or NC (i.e., normally open or normally closed), thus changing the activation for the use of the ground interruption, whereas depressing of the switch 73 activates or creates a "live" ground instead of a "kills" ground. In this instance the welder will have to maintain constant pressure on the switch 73 to continue to weld. Once the switch 73 is released the ground remains off. Furthermore, it can be appreciated that instead of the circuit interruption device 72 described above, a standard heavy duty power cutoff switch can be used in between the power source of the MIG welding machine 70 and the MIG welding machine 70 to facilitate start and stop of the weld strike.

Therefore, the protective welding shield and the welding tool tip adjusting device according to the exemplary embodiments of the present invention providing easy, fast and cost-effective way of calibrating, adjusting and presetting a height or depth of a welding tool tip relative to the protective welding shield. The protective welding shield in accordance with the present invention is both economical and user friendly and provides an improved method to weld single handed without a welder's helmet and further provides the welder a means to see and place the welding gun more accurately on the starting mark of the weld area prior to striking an arc.

The foregoing description of the exemplary embodiment(s) of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A combination of a protective welding shield with a welding tool and an adjusting device for calibrating, adjusting and/or presetting a position of a welding tip of the welding tool relative to the protective welding shield, the protective welding shield having a central longitudinal axis and comprising:
a hollow welding shield body having an outer wall defining a welding enclosure for housing the welding tip of the welding tool, the outer wall having a bottom edge defining an open bottom of the protective welding shield;
a weld viewer mounted to the hollow welding shield body, the weld viewer including at least one welding filter plate; and
a fastening device for adjustably securing the welding tool to the hollow welding shield body;
the adjusting device including a platform base having a central longitudinal axis and comprising:
a floor member;
a wall member extending outwardly from and surrounding the floor member; and
a sub-floor slot formed in the floor member and extending coaxially with the central longitudinal axis of the platform base;
the sub-floor slot having a planar sub-floor surface spaced inwardly from a planar floor surface of the floor member in the direction orthogonal to the floor surface;
the outer wall of the protective welding shield configured to be mounted to the floor member of the platform base so that the bottom edge of the hollow welding shield body is disposed within the wall member of the platform base and the welding tip of the welding tool faces the sub-floor slot of the platform base.

2. The combination of claim 1, wherein the sub-floor slot extends coaxially with the central longitudinal axis of the platform base.

3. The combination of claim 2, wherein the sub-floor slot extends along an entire length of the floor member.

4. The combination of claim 3, wherein the wall member extends outwardly from the floor member perpendicular to the floor member.

5. The combination of claim 4, wherein the wall member includes opposite and parallel side walls and a back wall; wherein the side walls extend parallel to the central longitudinal axis of the platform base; and wherein the back wall extends perpendicular to the central longitudinal axis of the platform base.

6. The combination of claim 5, wherein the outer wall of the hollow welding shield body includes opposite and parallel sidewalls, a rear wall and a top wall; wherein the sidewalls extend parallel to the central longitudinal axis of the protective welding shield; and wherein the rear wall extends perpendicular to the central longitudinal axis of the protective welding shield.

7. The combination of claim 6, wherein a width of the hollow welding shield body is equal or slightly less to a width of the floor member of the platform base.

8. The combination of claim 1, wherein the wall member of the platform base includes a gripping side groove therein extending along an entire length of the wall member.

9. The combination of claim 1, wherein the adjusting device further includes a saddle clip mounted to the wall member of the platform base for securely holding protective welding shield on the floor member of the platform base.

10. The combination of claim 1, wherein the at least one welding filter plate of the weld viewer is removably mounted to the hollow welding shield body; and wherein the protective welding shield further comprises a locking mechanism for containing the weld viewer inside the welding enclosure of the hollow welding shield body.

11. The combination of claim 10, wherein the locking mechanism includes a removable retainer clip or a removable fastener mounted to the hollow welding shield body.

12. The combination of claim 1, wherein the weld viewer includes an auto-darkening lens.

13. The combination of claim 1, wherein the protective welding shield further comprises an illumination lamp disposed within the welding enclosure of the protective welding shield for facilitating visual location of a weld strike prior to welding.

14. The combination of claim 1, further comprising a circuit interruption device that controls start and stop of a weld strike.

15. An adjusting device for calibrating, adjusting and/or presetting a position of a welding tip of a welding tool relative to a protective welding shield, the adjusting device comprising a platform base having a central longitudinal axis and including:
    a floor member;
    a wall member extending outwardly from and surrounding the floor member; and
    a sub-floor slot formed in the floor member and extending coaxially with the central longitudinal axis of the platform base;
    the sub-floor slot having a planar sub-floor surface spaced inwardly from a planar floor surface of the floor member in the direction orthogonal to the floor surface.

16. The adjusting device of claim 15, wherein the sub-floor slot extends coaxially with the central longitudinal axis of the platform base.

17. The adjusting device of claim 16, wherein the sub-floor slot extends along an entire length of the floor member.

18. The adjusting device of claim 15, wherein the wall member extends outwardly from the floor member perpendicular to the floor member.

19. The adjusting device of claim 18, wherein the wall member includes opposite and parallel side walls and a back wall; wherein the side walls extend parallel to the central longitudinal axis of the platform base; and wherein the back wall extends perpendicular to the central longitudinal axis of the platform base.

20. The adjusting device of claim 15, further comprising a saddle clip mounted to the wall member of the platform base for securely holding the protective welding shield on the floor member of the platform base.

21. The adjusting device of claim 15, wherein the wall member of the platform base includes a gripping side groove therein extending along an entire length of the wall member.

22. A method for adjusting a position of a welding tip of a welding tool relative to a protective welding shield, the method comprising the steps of:
    providing the protective welding shield comprising:
        a hollow welding shield body having an outer wall defining a welding enclosure housing the welding tip of the welding tool, the outer wall having a bottom edge defining the open bottom of the protective welding shield;
        a weld viewer mounted to the hollow welding shield body, the weld viewer including at least one welding filter plate; and
        a fastening device for adjustably securing the welding tool to the hollow welding shield body;
    providing an adjusting device for adjusting the position of the welding tip of the welding tool relative to the protective welding shield, the adjusting device including a platform base having a central longitudinal axis and comprising:
        a floor member;
        a wall member extending outwardly from and surrounding the floor member; and
        a sub-floor slot formed in the floor member and extending coaxially with the central longitudinal axis of the platform base;
        the sub-floor slot having a sub-floor surface spaced inwardly from a floor surface of the floor member in the direction orthogonal to the floor surface;
        the outer wall of the protective welding shield configured to be mounted to the floor member of the platform base so that the bottom edge of the hollow welding shield body is disposed within the wall member of the platform base and the welding tip of the welding tool faces the sub-floor slot of the platform base;
    mounting the hollow welding shield body of the protective welding shield on the floor member of the platform base such that the bottom edge of the hollow welding shield body engages the floor member of the platform base within the wall member of the platform base;
    inserting the welding tool into the welding enclosure of the protective welding shield;
    displacing the welding tool toward the sub-floor slot of the platform base until the welding tip engages the sub-floor surface of the sub-floor slot; and
    securing the welding tool to the hollow welding shield body with the fastening device.

23. The method of claim 22, further including the step placing a shim between the welding tip and the sub-floor slot prior to the step of displacing the welding tool toward the sub-floor slot of the platform base; and wherein the step of displacing the welding tool toward the sub-floor slot of the platform base includes the step of displacing the welding tool toward the sub-floor slot of the platform base until the welding tip engages the sub-floor surface of the sub-floor slot through the shim disposed on the sub-floor surface of the sub-floor slot.

24. The method of claim 22, wherein each of the floor surface of the floor member and the sub-floor surface of the sub-floor slot is a planar surface.

* * * * *